United States Patent [19]

Jubran et al.

[11] Patent Number: 5,077,897
[45] Date of Patent: Jan. 7, 1992

[54] TRIANGULAR SCRAPER TOOL

[75] Inventors: William Jubran, Kfar Meiliya, Israel; Andre Carossino, Louveciennes, France

[73] Assignee: Vargus Ltd., Nahariya, Israel

[21] Appl. No.: 576,816

[22] Filed: Sep. 4, 1990

[30] Foreign Application Priority Data

Sep. 8, 1989 [IL] Israel ............................ 91567

[51] Int. Cl.⁵ .............................................. B26B 3/00
[52] U.S. Cl. .......................................... 30/172; 30/169
[58] Field of Search ................. 30/169, 172, 174, 317; 15/236.01, 236.1

[56] References Cited

U.S. PATENT DOCUMENTS

| | | |
|---|---|---|
| 1,830,692 | 11/1931 | Becker ............................ 30/317 |
| 2,359,607 | 10/1944 | Bashara ............................ 15/236.01 |

FOREIGN PATENT DOCUMENTS

0197650 9/1938 Switzerland ........................... 30/169

Primary Examiner—Frank T. Yost
Assistant Examiner—Allan M. Schrock
Attorney, Agent, or Firm—Benjamin J. Barish

[57] ABSTRACT

A scraper tool particularly useful for hand deburring holes as well as concave and straight surfaces includes a scraper blade being integrally formed with a front part, an intermediate part, and a back part joined to a shank at the back end of the scraper blade, which shank is fixed to the handle. The front, intermediate and back parts are all of triangular section and define three exposed, continuous sharp edges extending axially of the scraper blade. These sharp edges converge toward each other at the front part and coming to a point at the front tip of the scraper blade, are parallel to each other at the intermediate part, and converge toward each other at the back part to the juncture with the shank.

16 Claims, 1 Drawing Sheet

U.S. Patent    Jan. 7, 1992    5,077,897
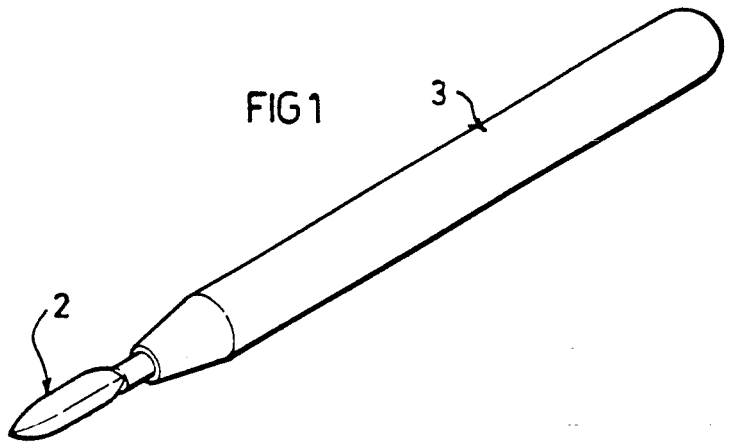
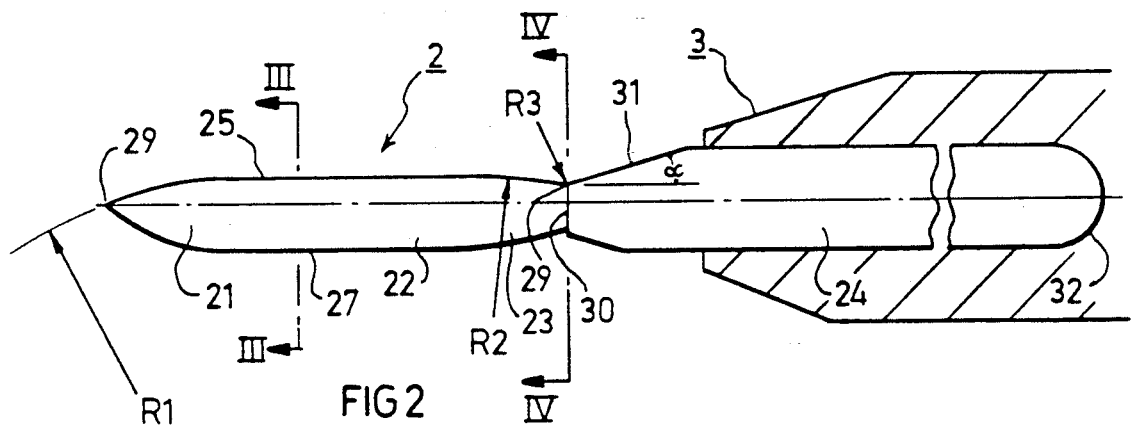
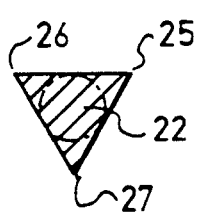
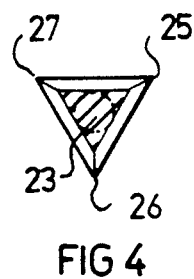
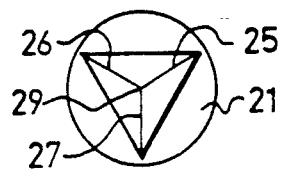

TRIANGULAR SCRAPER TOOL

RELATED APPLICATIONS

The present application is related to our patent application Ser. No. 07/567,868 for Flat Scraper Tool, and our application Ser/ No. 07/576,815 for Round Scraper Tool, both filed the same date as the present application.

FIELD AND BACKGROUND OF THE INVENTION

The present invention relates to scraper tools such as are used for deburring holes or other surfaces in workpieces.

After a workpiece is machined, drilled or grooved, it is frequently necessary to perform a deburring operation in order to remove burrs and to smoothen its surface. A number of hand deburring tools have been developed for this purpose, but the known tools are generally not efficiently applicable for deburring many different types of machined surfaces.

OBJECTS AND BRIEF SUMMARY OF THE INVENTION

An object of the present invention is to provide a scraper tool which can be efficiently used for deburring various types of machined surfaces.

According to the present invention, there is provided a scraper tool particularly useful for hand deburring holes as well as concave and straight surfaces, comprising a scraper blade at the front end of the tool joined to a handle at the back end of the tool. The scraper blade is integrally formed with a front part, an intermediate part, and a back part joined to a shank at the back end of the scraper blade, which shank is fixed to the handle. The front, intermediate and back parts are all of triangular section and define three exposed, continuous sharp edges extending axially of the scraper blade. The three continuous sharp edges converge toward each other at the front part and come to a point at the front tip of the scraper blade, are parallel to each other at the intermediate part, and converge toward each other at the back part to the juncture with the shank.

According to a further feature in the described embodiment, the three exposed, continuous sharp edges are curved at the front and back parts, the radius of curvature at the front part being of the same sign as (i.e., on the same side of the blade longitudinal axis), but smaller than, that at the back part. Preferably, the radius of curvature at the front part is less than one third that at the back part.

According to a further feature in the described preferred embodiment, the back part of the scraper blade is joined to the shank at a back angle of 10-20 degrees. Particularly good results have been obtained when this back angle is approximately 15 degrees.

A scraper tool constructed in accordance with the above features is particularly useful for hand deburring various types of machined surfaces, including holes, concave surfaces and straight surfaces. Thus, the front part of the scraper blade accomodates itself to the size of the hole to be deburred, particularly of small diameter holes; and if the hole is of large diameter, the front and intermediate parts may penetrate completely into the hole to permit the straight intermediate part or the curved back part of the scraper blade to be used for deburring. The deburring operation is performed with a circular or elliptical hand movement, with the appropriate portion of the three continuous sharp edges engaging the workpiece to remove the burrs. Thus, the tool may be used for deburring not only holes of different diameters, but also machined surfaces of other types, such as concave, straight and grooved surfaces.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a three-dimensional view illustrating one form of deburring tool constructed in accordance with the present invention;

FIG. 2 is an enlarged side-elevational view illustrating the scraper blade in the tool of FIG. 1;

FIGS. 3 and 4 are sectional views along lines III—III and IV—IV, respectively, of FIG. 2; and FIG. 5 is an end view of the scraper tool illustrated in FIG. 1.

DESCRIPTION OF A PREFERRED EMBODIMENT

The scraper tool illustrated in the drawings is particularly useful for hand deburring holes, as well as concave, groved, and straight surfaces. It comprises two main components, namely a scraper blade, generally designated 2, at the front end, joined to a handle 3 at the back end. Preferably, the blade 2 is made of hard steel, while the handle is made of aluminum.

As shown particularly in FIG. 2, the scraper blade 2 is integrally formed with a front part 21, an intermediate part 22, and a back part 23 joined to a shank 24 at the back end of the scraper blade, which shank is fixed to the handle 3. All the foregoing parts 21, 22 and 23 are of triangular section and define three exposed, continuous sharp edges, as shown at 25, 26 and 27 in FIGS. 3 and 4, extending axially of the scraper blade up to the juncture of the back part 23 with shank 24. All the foregoing parts of blade 2, including its shank 24, are integrally formed from a single piece of metal by a machining operation.

The three exposed, continuous sharp edges 25, 26, 27, extending axially of the three parts 21, 22, 23, converge toward each other at the front part 21 and come to a point 29 at the front tip of the scraper blade 2. The three exposed edges 25-27 are parallel to each other at the intermediate part 22, and again converge toward each other at the back part 23 towards juncture line 30 with the shank 24.

More particularly, the three exposed sharp edges 25-27 are curved both at the front part 21 and the back part 23 of the scraper blade. The radius of curvature of the three sharp edges 25-27 at the front part is of the same sign as (i.e., on the same side of the blade longitudinal axis), but substantially smaller than, preferably less than one third, that at the back part 23. Particularly good results are obtainable when the radius of curvature (R1) of the three sharp edges 25-27 at the front part 21 of the scraper blade is from 8-12 mm, preferably approximately 10 mm, whereas the radius of curvature (R2) of the three sharp edges at the back part 23 is from 32-40 mm, preferably approximately 36 mm.

The shank 24 is connected to the back part 23 of the scraper blade 2 by a smooth curve 29, e.g., having a radius of 0.5 mm.

The axial length of the back part 23 of the blade to the juncture line 30 with the shank 24 is larger than that of either the front part 21 or the intermediate part 22. Preferably, the axial length of the front part 21 is approximately equal to that of the intermediate part 22. Particularly good results have been obtained when the axial length of the front part 21 and intermediate part 22 is each 3–4 mm, and that of the back part 23 is 4–5 mm.

Preferably the thickness of the scraper blade (i.e. the height of its triangular section) is 2–2.5 mm at the intermediate part 22 and decreases to 1.3–1.6 mm at the back end of the back part 23 where joined along curve 29 and juncture line 30 to the shank 24. In the described preferred embodiment, the thickness of the scraper blade is approximately 2.25 mm at the intermediate part 22 and decreases to approximately 1.40 mm at the juncture line 30 of the back part 23 with the shank 24.

The shank 24 is preferably of cylindrical section but has a conical surface 31 at the inner end where joined to the back part 23 of the scraper blade 2, and a semi-circular surface 32 at the outer end. The conical surface 31 forms a back angle ($\alpha$) which is preferably 10–20 degrees, best results having been obtained when that angle is approximately 15 degrees. The length of the shank 24 is preferably greater than the total length of the front, intermediate and back parts 21-23 of the scraper blade to the juncture line 30. In the described embodiment, the length of the shank 24 to the juncture line 30 is approximately 18 mm, whereas the length of the front part 21 is 3.75 mm, that of the intermediate part 22 is 3.75 mm, and that of the back part 23 is 4.50 mm, so that the total length of the three parts 21-23 of the scraper blade 3 to the juncture line 30 is approximately 12 mm.

As described earlier, the scraper tool illustrated in the drawings may be used for deburring many diversely machined surfaces, including flat, grooved and concave surfaces, but is particularly useful for deburring holes of various diameters. The exposed curved sharp edges 25-27 at the front part 21 of the scraper blade enable the blade to enter and deburr small-diameter holes, the front part of the blade penetrating into the hole according to its diameter. For larger-diameter holes, the exposed sharp edges 25-27 at the intermediate part 22 of the blade may be used, and for still larger diameters or deeper holes, the exposed curved sharp edges at the back part 23 may be used. In all these deburring operations, the handle may be moved in a circular or elliptical path.

While the invention has been described with respect to one preferred embodiment, it will be appreciated that many variations, modifications and other applications of the invention may be made.

What is claimed is:

1. A scraper tool particularly useful for hand deburring holes as well as concave and straight surfaces, comprising:
    a scraper blade at the front end of the tool joined to a handle at the back end of the tool;
    said scraper blade being integrally formed with a front part, an intermediate part, and a back part joined to a shank at the back end of the scraper blade, which shank is fixed to said handle;
    said front, intermediate and back parts all being of triangular section and defining three exposed, continuous, sharp edges extending axially of the scraper blade;
    the three exposed continuous, sharp edges converging toward each other at the front part and coming to a point at the front tip of the scraper blade, being parallel to each other at the intermediate part, and converging toward each other at the back part to the juncture with the shank;
    the three exposed, continuous, sharp edges being curved at the front and back parts, the radius of curvature at the front part being of the same sign as, but smaller than, that at the back part.

2. The scraper tool according to claim 1, wherein said radius of curvature at the front part is less than one third that at the back part.

3. The scraper tool according to claim 2, wherein said radius of curvature at the front part is 8–12 mm.

4. The scraper tool according to claim 3, wherein said radius of curvature at the front part is approximately 10 mm.

5. The scraper tool according to claim 2, wherein said radius of curvature at the back part is 32–40 mm.

6. The scraper tool according to claim 5, wherein said radius of curvature at the back part is approximately 36 mm.

7. The scraper tool according to claim 1, wherein the shank is joined to the back part at a back angle of 10–20 degrees.

8. The scraper tool according to claim 7, wherein said back angle is 15 degrees.

9. The scraper tool according to claim 1, wherein the axial length of the back part is larger than that of the front part and of the intermediate part.

10. The scraper tool according to claim 9, wherein the axial length of the front part is approximately equal to that of the intermediate part.

11. The scraper tool according to claim 10, wherein the axial length of the front part is approximately 4 mm, of the intermediate part is approximately 4 mm, and of the back part is approximately 5 mm.

12. The scraper tool according to claim 1, wherein the thickness of the scraper blade is 2–2.5 mm at the intermediate part decreasing to 1.3–1.6 mm at the back end of the back part joined to the shank.

13. The scraper tool according to claim 12, wherein the thickness of the scraper blade is approximately 2.25 mm at the intermediate part decreasing to approximately 1.40 mm at the back end of the back part joined to the shank.

14. The scraper tool according to claim 1, wherein said shank has a length greater than the total length of the front, intermediate and back parts of the scraper blade.

15. The scraper tool according to claim 1, wherein the scraper blade is of hard steel.

16. The scraper tool according to claim 1, wherein said handle is of aluminium.

* * * * *